Oct. 21, 1924.

E. W. NELSON 1,512,477

MOTION PICTURE CAMERA

Filed Aug. 1, 1921

Inventor
Erik W. Nelson
By his Attorneys
Redding & Greeley

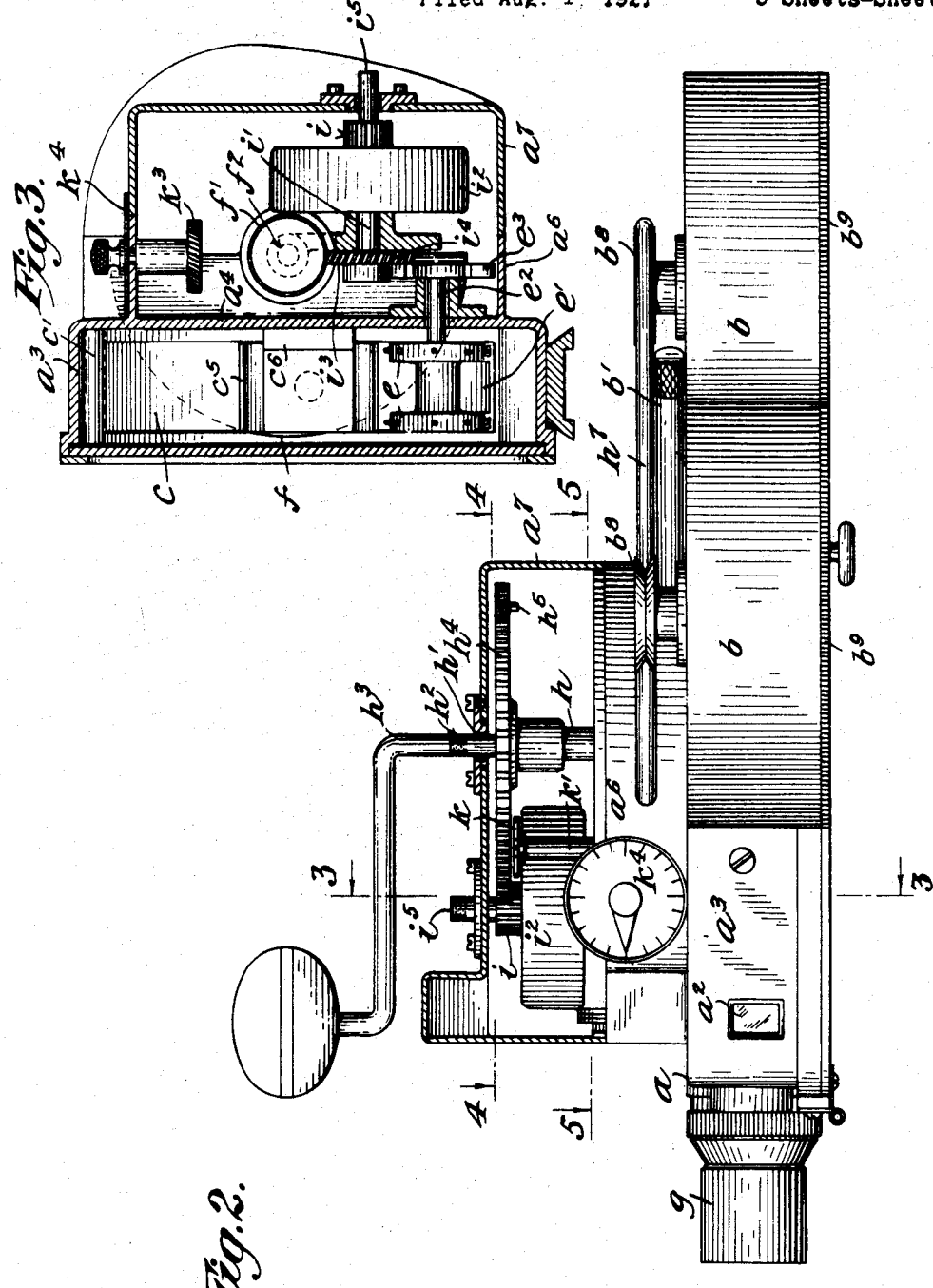

Patented Oct. 21, 1924.

1,512,477

UNITED STATES PATENT OFFICE.

ERIK W. NELSON, OF NEW ROCHELLE, NEW YORK.

MOTION-PICTURE CAMERA.

Application filed August 1, 1921. Serial No. 488,867.

*To all whom it may concern:*

Be it known that I, ERIK WILLIAM NELSON, a citizen of the United States, and a resident of New Rochelle, in the State of New York, have invented certain new and useful Improvements in Motion-Picture Cameras, of which the following is a specification, reference being had to the accompanying drawings, forming a part hereof.

The object of this invention is to produce a small, compact and simple motion picture camera, adapted for the use of a half-width film and of a universal focus lens, capable of being carried about easily and set on any convenient rest, of low cost, and withal of high efficiency. The invention will be explained more fully hereinafter with reference to the accompanying drawings in which it is illustrated and in which—

Figure 2 is a top view of the same with the gear casing in section.

Figure 3 is a view in section on the plane indicated by the broken line 3—3 of Figure 2, looking in the direction of the arrows.

Figure 1:
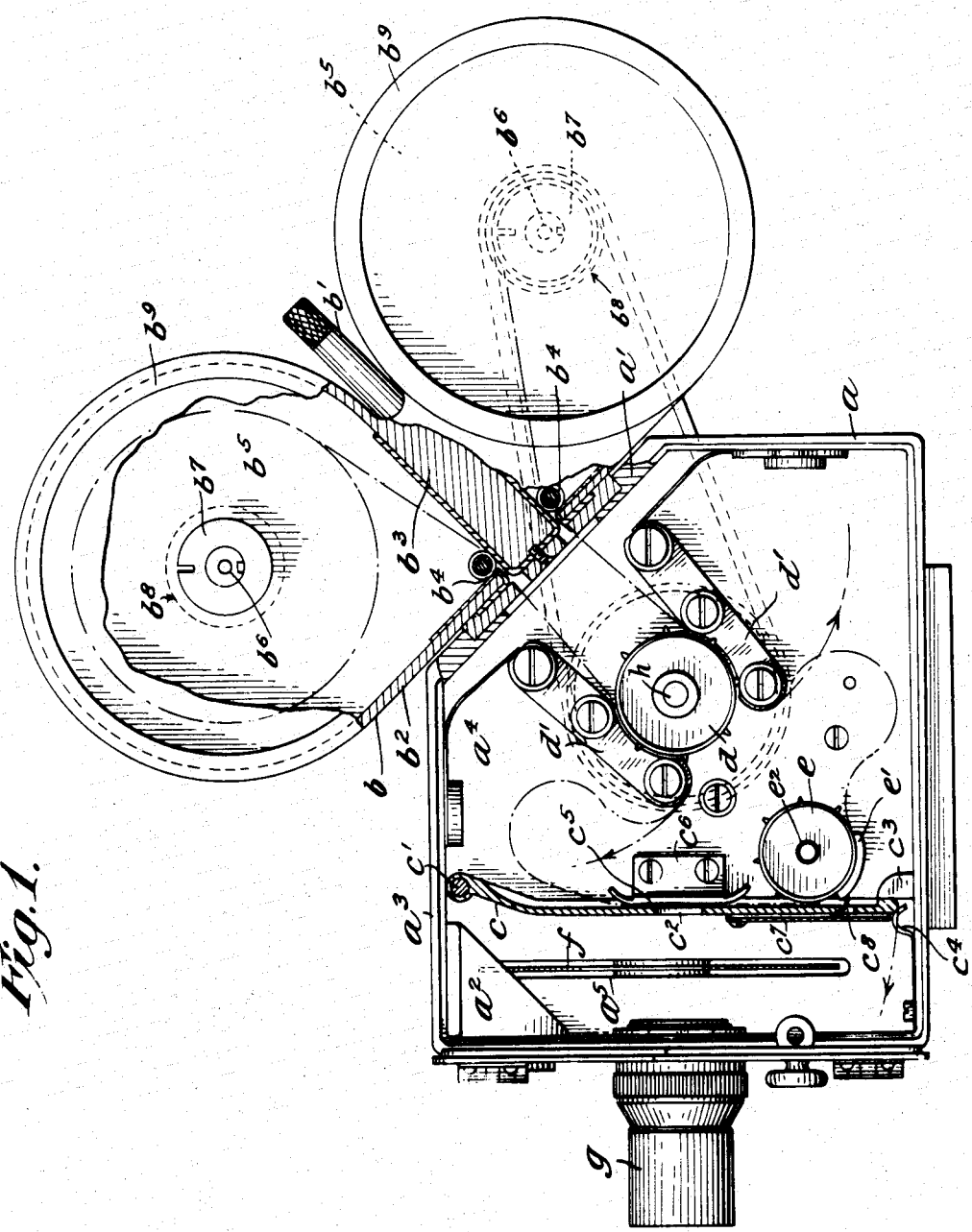
Figure 1 is a view of the camera in side elevation, with the door open, and with the film gate, a portion of the casing and a portion of the film magazine in section.
Figure 4:
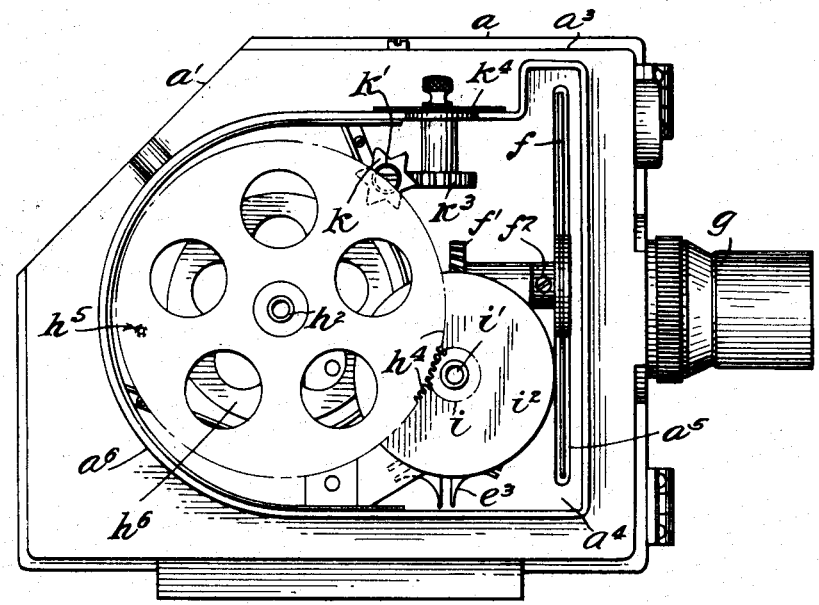
Figure 4 is a view in elevation of the right hand side of the camera on line 4—4 of Figure 2, with the removable casing omitted.
Figure 5:
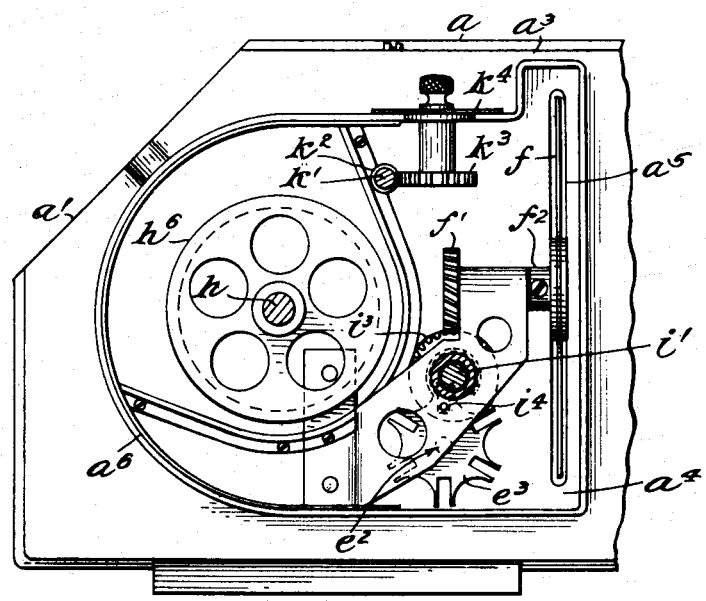
Figure 5 is a view partly in elevation and partly in section on the plane indicated by the broken line 5—5 of Figure 2, also with the removable casing omitted.

The main casing $a$ of the camera is substantially rectangular, but with a fifth side $a'$ formed at an angle preferably of about 45° with the adjacent walls to form a seat for the film magazine $b$ so that the eye piece of the finder $a^2$ can be placed in the top $a^3$ of the casing and be visible when the camera is held in position for use with the operator looking down upon the finder. The film magazine, which is substantially of usual construction, is held to its seat on the oblique wall $a'$ of the casing by a knurled screw shown at $b'$ and consists of an integral casing which has a flat side $b^2$ for co-operation with the seat $a'$, a solid partition $b^3$, with light excluding passages for the film, one at each side of the partition $b^3$, as at $b^4$, and film receiving chambers $b^5$ each provided with a spindle $b^6$, spool $b^7$ and external pulley $b^8$, each film chamber being closed by a removable circular cap $b^9$, preferably screw threaded in its seat. This magazine can be removed and replaced readily and films can also be rewound, removed and replaced readily.

The right hand side of the main casing is closed by a wall $a^4$, forming a chamber within which are located the finder $a^2$, the film gate $c$, the continuous feed drum or sprocket $d$, with its pressers $d'$, and the intermittent feed drum or sprocket $e$. The wall $a^4$ is slotted vertically, as at $a^5$, to permit the movement of the shutter $f$ which is mounted outside the main casing $a$. The front wall of the main casing supports the lens tube and diaphram indicated generally at $g$, the lens contemplated being of the universal focus variety.

The film gate $c$ consists of a plate which is pivotally hung at the top of the main casing, as at $c'$, is apertured as at $c^2$, and is held in place at its lower end, against a fixed stop $c^3$, by a spring friction latch $c^4$. The pivotal support $c'$ is a straight spindle, secured at one end to the plate $a^4$ and free at its other end so that the gate can be slipped off readily for cleaning when necessary. For threading up the film the gate can be swung away from the stop $c^3$ over the friction spring $c^4$, and from the fixed film guide $c^5$ which is secured at one edge, as by a flange $c^6$, to the wall $a^4$ and is free at the other edge.

A tension device $c^7$ is secured to the gate and is arranged to bear, through an opening $c^8$, against the film to insure steadiness of movement. A fixed film guide $e'$ is arranged to co-operate with the sprocket $e$.

On the right hand side of the main casing $a$ is formed a fixed flange or web $a^6$ which, with the removable cover $a^7$, forms a casing for the gearing by which the film sprockets and the shutter are operated.

The main shaft $h$, mounted in a suitable bearings $h'$ and having a screw threaded connection at $h^2$ for the detachable crank $h^3$, carries a gear $h^4$ which meshes with a pinion $i$ on a short shaft $i'$, which is mounted in suitable bearings and receives a fly wheel $i^2$. On the shaft $i'$ is fixed also a spiral gear $i^3$ which meshes with a spiral gear $f'$ on the shaft $f^2$ of the shutter $f$.

The continuous feed sprocket $d$ is fixed on the shaft $h$, within the main casing, so that the continuous feed sprocket is operated directly by the movement of the crank $h^3$, which is steadied by the fly wheel $i^2$ on the shaft $i'$. The intermittent feed sprocket $e$ is fixed, within the main casing, on a shaft $e^2$ which is extended through the wall $a^4$ and has fixed thereon, outside the wall $a^4$, the star wheel member $e^3$ of a Geneva gear. The co-operating pin and cam member $i^4$ of the Geneva gear is fixed to or made integral with the spiral gear $i^3$ and the shutter and the intermittent feed sprocket are thus driven in timed relation with each other and with the continuous feed sprocket $d$ through a train of gearing which includes but few parts.

The gear $h^4$ on the main shaft $h$ is armed with a pin $h^5$ which engages a star wheel $k$, the shaft $k'$ of which carries a worm $k^2$ in mesh with a worm wheel $k^3$ on the shaft of an indicator $k^4$, which serves to indicate the length of film exposed.

The shaft $i'$ has at $i^5$ a threaded socket with which the crank $h^3$ can be engaged for slow movement of the film. The shaft $h$ has fixed thereon also a pulley $h^6$ which can be connected operatively, by the usual belt $h^7$, with either pulley $b^8$ of the spindles $b^6$ of the film magazine.

It will be understood that details of construction and arrangement may be varied to suit different conditions of use or the convenience of the manufacturer without departing from the spirit of the invention except as pointed out in the claims.

I claim as my invention:

1. In a motion picture camera, a main casing generally rectangular in outline, having a finder eye-piece in its top and having one wall adjacent to the top at the rear at an oblique angle to form a seat for a film magazine.

2. In a motion picture camera, the combination of a main casing generally rectangular in outline and having a finder eye-piece in its top and one wall adjacent to the top at the rear at an oblique angle and a film magazine mounted on said oblique wall.

3. In a motion picture camera, the combination of a main casing generally rectangular in outline and having a finder eye-piece in its top and one wall adjacent to the top at the rear at an oblique angle, a film magazine mounted on said oblique wall, and means to secure the magazine detachably upon said oblique wall.

This specification signed this 28th day of July A. D. 1921.

ERIK W. NELSON.